C. DORNIER.
TUBULAR HOLLOW BODY.
APPLICATION FILED JUNE 28, 1920.
1,419,828.
Patented June 13, 1922.
Fig. 1.
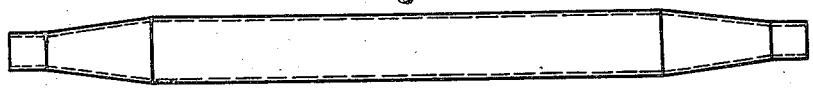
Fig. 2.
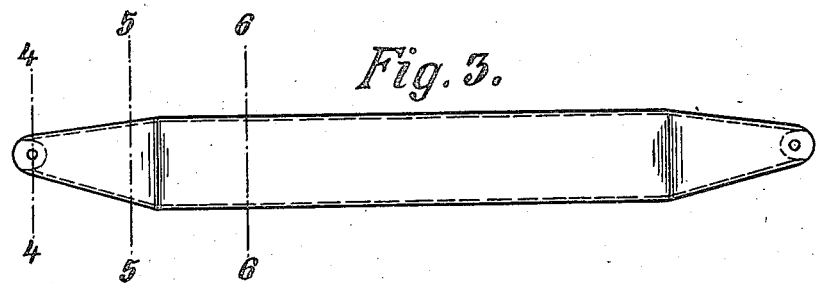
Fig. 3.
Fig. 4.    Fig. 5.    Fig. 6.
  
INVENTOR:
Claude Dornier.

UNITED STATES PATENT OFFICE.

CLAUDIUS DORNIER, OF FRIEDRICHSHAFEN, GERMANY.

TUBULAR HOLLOW BODY.

1,419,828.   Specification of Letters Patent.   Patented June 13, 1922.

Application filed June 28, 1920. Serial No. 392,564.

*To all whom it may concern:*

Be it known that I, CLAUDIUS DORNIER, a German citizen, residing at Friedrichshafen, a/B., Germany, (for which I have filed an application in Germany Nov. 22, 1917), have invented certain new and useful Improvements in Tubular Hollow Bodies, of which the following is a specification.

My invention refers to tubular hollow bodies suited for employment in light construction, and more especially to stays for flying machines. It is the endeavor of the invention to create satisfactory possibilities for connecting the ends of the tubes, without having to continue the middle parts of the tubes with their comparatively large cross-sections right to the ends or being forced to join them to special connecting pieces of a smaller length of development. The desired purpose is achieved by shaping them in a particular manner.

This alternation of shape can be performed by aid of suitable presses or by drawing and stamping respectively. As the length of development of the tube ends is considerably smaller than that of the middle part, the eyes customary for bolt connections can be obtained in the size suitable for each case, by simply pressing the tube ends flat. A special strength is given to these eyes in accordance with the invention by the fact that, owing to the peculiar dislocation of the material, they show a considerably larger thickness of material corresponding to the reduced length of development. The middle part of the tubular body, if it is to offer a small air-resistance, for instance as a flying machine tie, can be provided with the well known guttiform shape without detriment to the tapering off at the ends which has taken place.

The invention is of special value for such constructional materials used in light construction, which, like aluminium alloys, for instance, can only be welded with difficulty or not at all, for, according to the invention, the connections of the stays can be adapted with ease to the purposes in question in each case without having to employ a welded or riveted seam.

The drawings attached to this specification and forming part thereof, illustrate a modification by way of example, a view each being represented by Fig. 1 of a still unworked tube, Fig. 2 of the same tube with the ends tapered off, Fig. 3 of a finished stay of a flying machine, and Figs. 4–6 representing cross-sections of the flying-machine stays for the lines 4—4, 5—5, 6—6 of Fig. 3.

In the tube tapered off according to Fig. 2 the uttermost ends are pronouncedly cylindrical. In the stay for a flying-machine according to Fig. 3 such an end shape was given up for the purpose of further simplifying the reshaping.

I claim:

1. In a flying machine strut in combination, a seamless tubular main portion of stream line section and a seamless gradually tapering end portion of greater wall thickness than said main portion.

2. In a flying machine strut in combination, a seamless tubular main portion of stream line section and a flat seamless gradually tapering end portion of greater wall thickness than said main portion.

3. In a flying machine strut in combination, a seamless tubular main portion of stream line section, a seamless gradually tapering intermediate portion and a seamless end portion of substantially equal diameter and greater wall thickness than said main portion.

In testimony whereof I affix my signature.

CLAUDE DORNIER.